United States Patent
R C et al.

(10) Patent No.: US 11,881,907 B2
(45) Date of Patent: Jan. 23, 2024

(54) FREQUENCY TRACKING LOOP PULL-IN RANGE EXTENSION USING FREQUENCY ERROR WRAPAROUND DETECTION AND CORRECTION

(71) Applicant: QUALCOMM Incorporated, San Diego, CA (US)

(72) Inventors: Aswin R C, Hyderabad (IN); Manav Lnu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/457,894

(22) Filed: Dec. 6, 2021

(65) Prior Publication Data
US 2023/0179310 A1    Jun. 8, 2023

(51) Int. Cl.
*H04B 17/391*    (2015.01)

(52) U.S. Cl.
CPC .................................. *H04B 17/391* (2015.01)

(58) Field of Classification Search
CPC ...................................................... H04B 17/391
See application file for complete search history.

(56) References Cited

U.S. PATENT DOCUMENTS

| | | | |
|---|---|---|---|
| 8,744,020 B2 | 6/2014 | Andgart et al. | |
| 2006/0242445 A1* | 10/2006 | Aweya ...................... | H03L 7/08 713/400 |
| 2016/0182201 A1* | 6/2016 | Jiang ...................... | H04L 5/005 370/235 |

OTHER PUBLICATIONS

International Search Report and Written Opinion—PCT/US2022/050452—ISA/EPO—dated Mar. 13, 2023.

* cited by examiner

*Primary Examiner* — Duc C Ho
(74) *Attorney, Agent, or Firm* — Procopio, Cory, Hargreaves & Savitch LLP

(57) ABSTRACT

Aspects present herein relate to methods and devices for wireless communication including an apparatus, e.g., a UE. The apparatus may measure a frequency error from a first pair of pilot symbols and a second pair of pilot symbols received via a channel associated with communication between the UE and a base station, the measured frequency error from the first pair of pilot symbols and the second pair of pilot symbols corresponding to a first frequency error measurement and a second frequency error measurement. The apparatus may detect a first frequency wraparound in the first frequency error measurement and a second frequency wraparound in the second frequency error measurement. The apparatus may adjust the first frequency error measurement based on the first frequency wraparound or the second frequency error measurement based on the second frequency wraparound if the first frequency wraparound or the second frequency wraparound is the non-zero value.

30 Claims, 13 Drawing Sheets

FREQUENCY TRACKING LOOP PULL-IN RANGE EXTENSION USING FREQUENCY ERROR WRAPAROUND DETECTION AND CORRECTION

TECHNICAL FIELD

The present disclosure relates generally to communication systems, and more particularly, to frequency error detection in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, at least one of a pilot or data via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel. The apparatus may also measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement. Additionally, the apparatus may combine the first frequency error measurement and the second frequency error measurement, where the first frequency error measurement or the second frequency error measurement is adjusted based on the combination. The apparatus may also calculate a difference between the first frequency error measurement and the second frequency error measurement, where the first frequency wraparound or the second frequency wraparound is detected based on the difference between the first frequency error measurement and the second frequency error measurement. Further, the apparatus may detect a first frequency wraparound in the first frequency error measurement and a second frequency wraparound in the second frequency error measurement. The apparatus may also adjust the first frequency error measurement based on the detected first frequency wraparound or the second frequency error measurement based on the detected second frequency wraparound if the first frequency wraparound is a non-zero value or the second frequency wraparound is the non-zero value. Also, the apparatus may update a frequency tracking loop (FTL) state for the frequency error between the UE and the base station based on the adjusted first frequency error measurement or the adjusted second frequency error measurement. The apparatus may also compensate for the first frequency wraparound or the second frequency wraparound based on the adjusted first frequency error measurement or the adjusted second frequency error measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
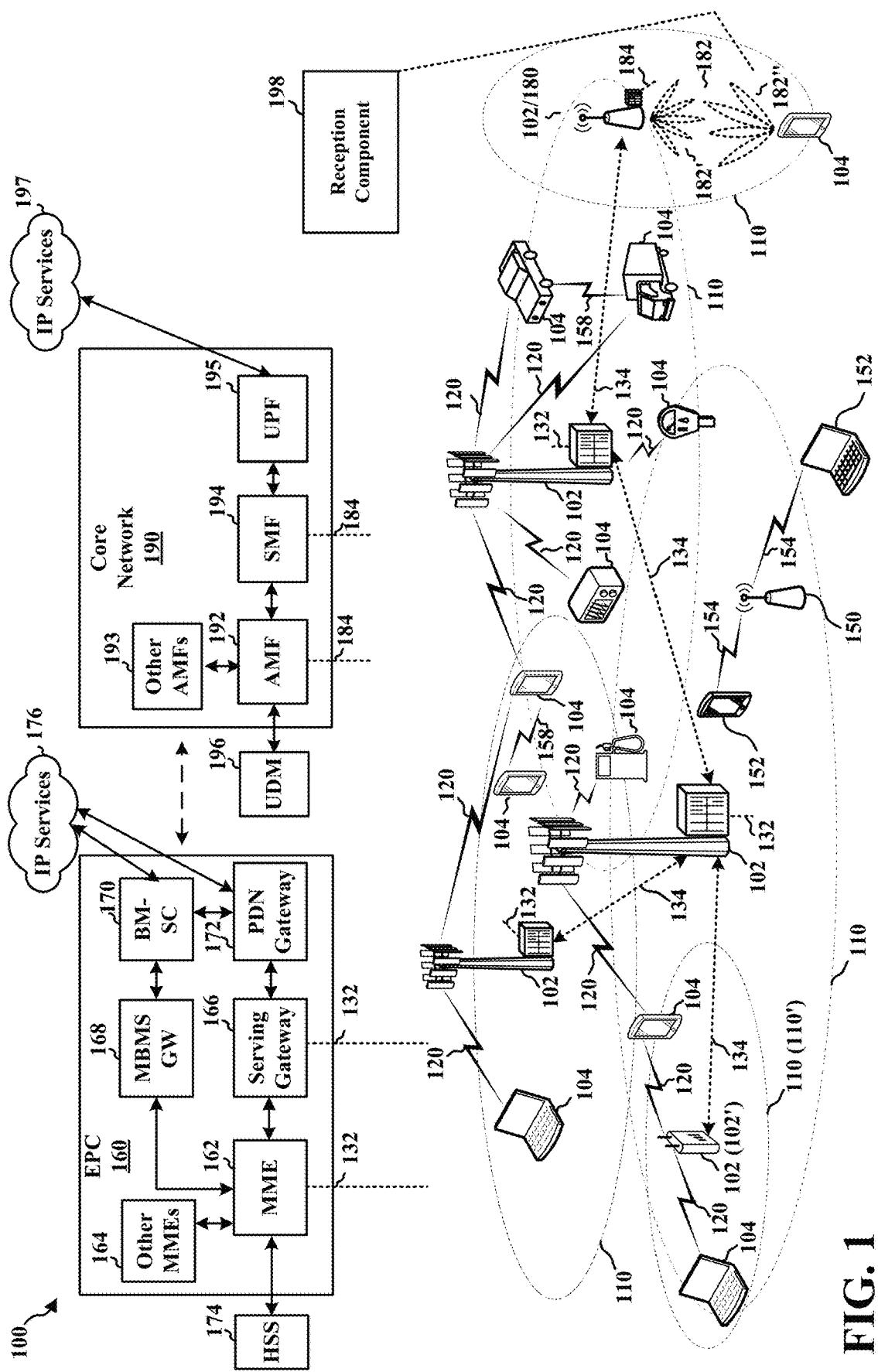
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive, from a base station, at least one of a pilot or data via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel. Reception component 198 may also be configured to measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement. Reception component 198 may also be configured to combine the first frequency error measurement and the second frequency error measurement, where the first frequency error measurement or the second frequency error measurement is adjusted based on the combination. Reception component 198 may also be configured to calculate a difference between the first frequency error measurement and the second frequency error measurement, where the first frequency wraparound or the second frequency wraparound is detected based on the difference between the first frequency error measurement and the second frequency error measurement. Reception component 198 may also be configured to detect a first frequency wraparound in the first frequency error measurement and a second frequency wraparound in the second frequency error measurement. Reception component 198 may also be configured to adjust the first frequency error measurement based on the detected first frequency wraparound or the second frequency error measurement based on the detected second frequency wraparound if the first frequency wraparound is a non-zero value or the second frequency wraparound is the non-zero value. Reception component 198 may also be configured to update a frequency tracking loop (FTL) state for the frequency error between the UE and the base station based on the adjusted first frequency error measurement or the adjusted second frequency error measurement. Reception component 198 may also be configured to compensate for the first frequency wraparound or the second frequency wraparound based on the adjusted first frequency error measurement or the adjusted second frequency error measurement.

Although the following description may be focused on 5G NR, the concepts described herein may be applicable to other similar areas, such as LTE, LTE-A, CDMA, GSM, and other wireless technologies.

Figure 2:
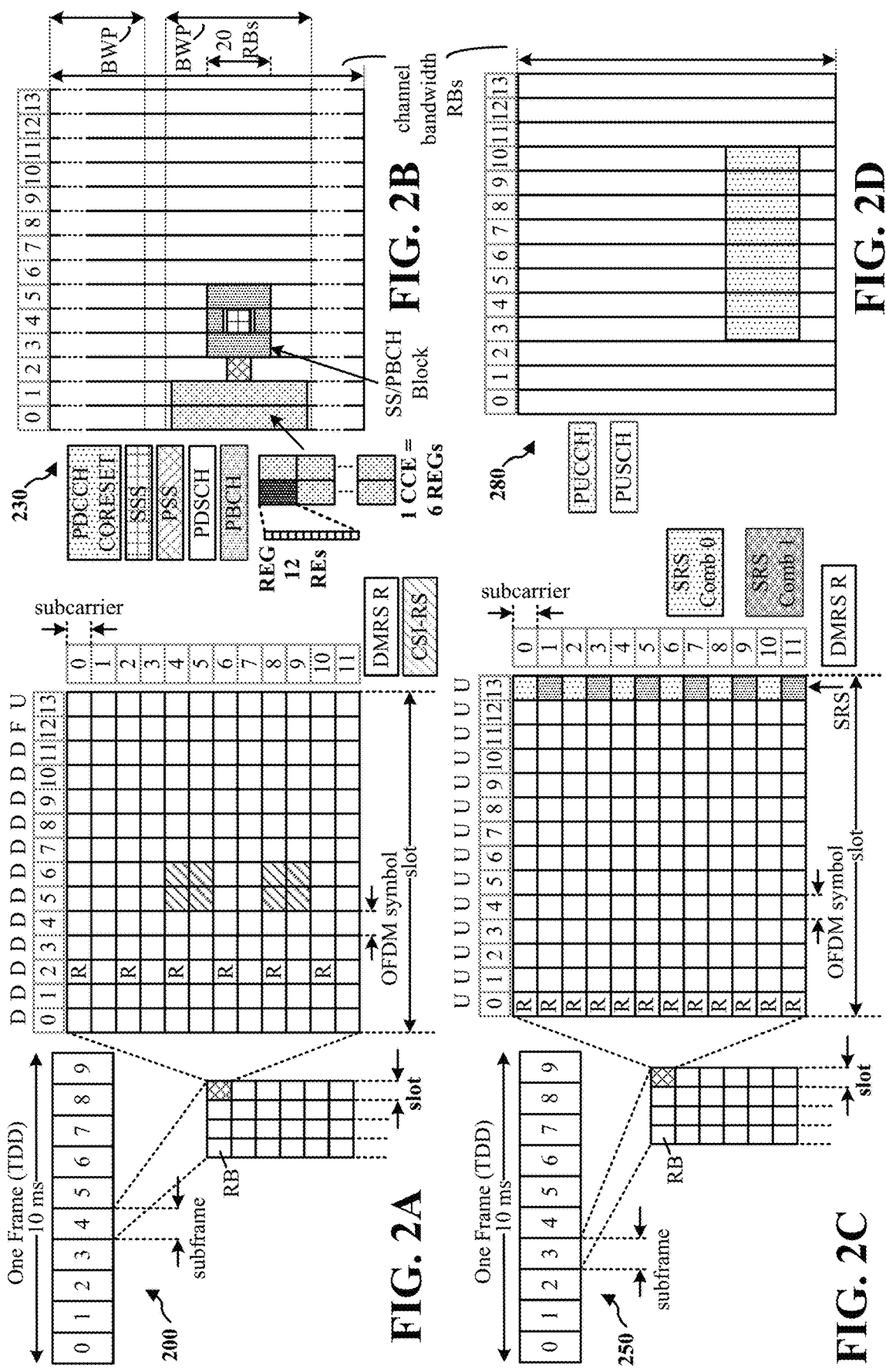
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
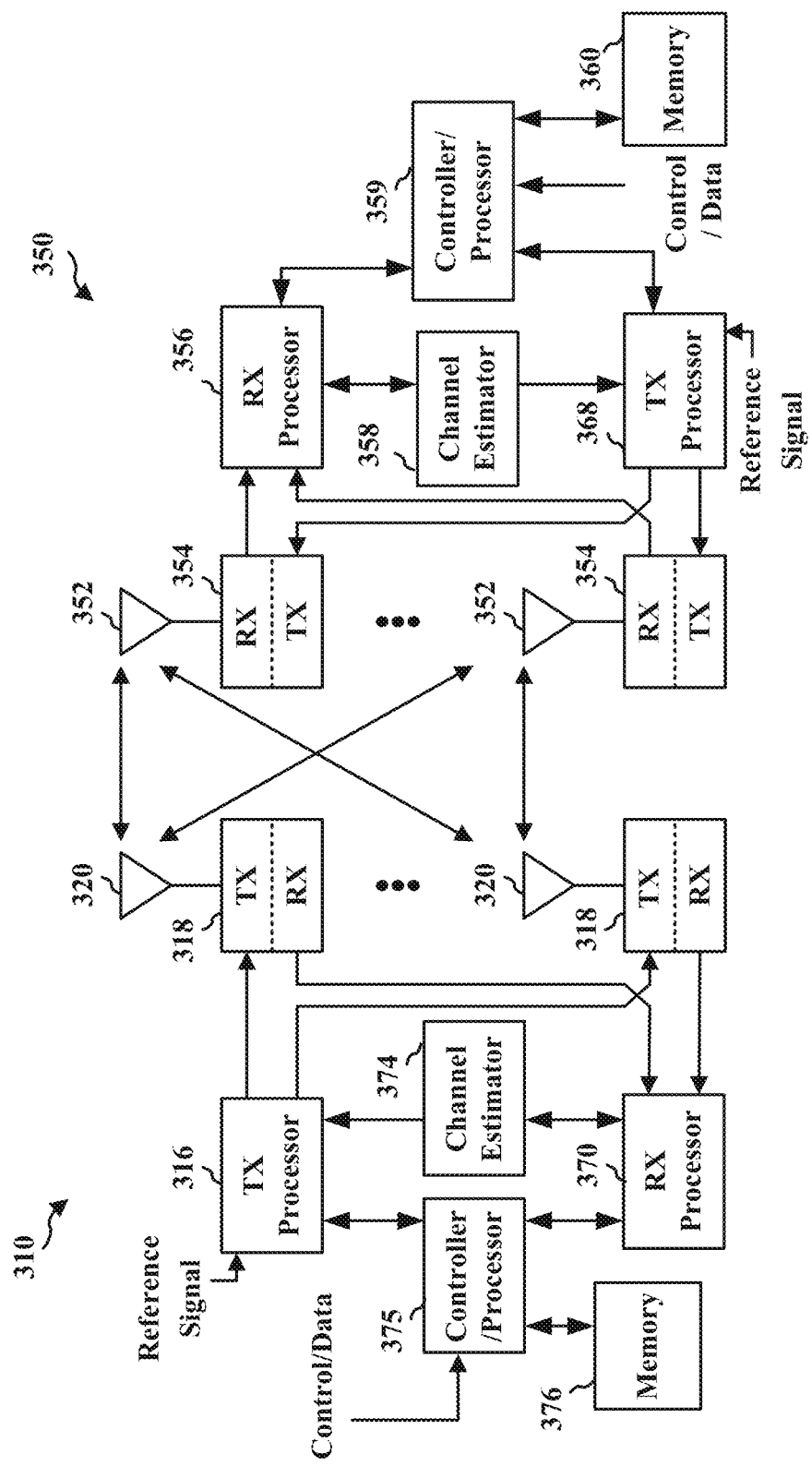
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Some aspects of wireless communications, e.g., LTE or 5G NR, may utilize orthogonal frequency division multiplexing (OFDM) as a digital multicarrier modulation scheme. OFDM systems may also utilize channel estimation. For instance, channel estimation may be utilized to increase the capacity of OFDM access (OFDMA) systems, such as by improving the system performance in terms of bit error rate. In order to facilitate the estimation of the channel characteristics, wireless communications may utilize cell-specific reference signals (e.g., pilot symbols) in both time and frequency. In some instances, the pilot symbols may be used to provide an estimate of a channel at a given location within a subframe.

In some aspects, pilot symbols may be assigned positions within a subframe depending on a cell identification number and/or a transmit antenna. As the pilot symbols are uniquely positioned within a subframe, this may help to ensure that the pilot symbols do not interfere with one another. As such, the pilot symbols may be used to provide a reliable estimate of the gains associated with each resource element within a transmitted grid by a propagation channel.

Figure 4:
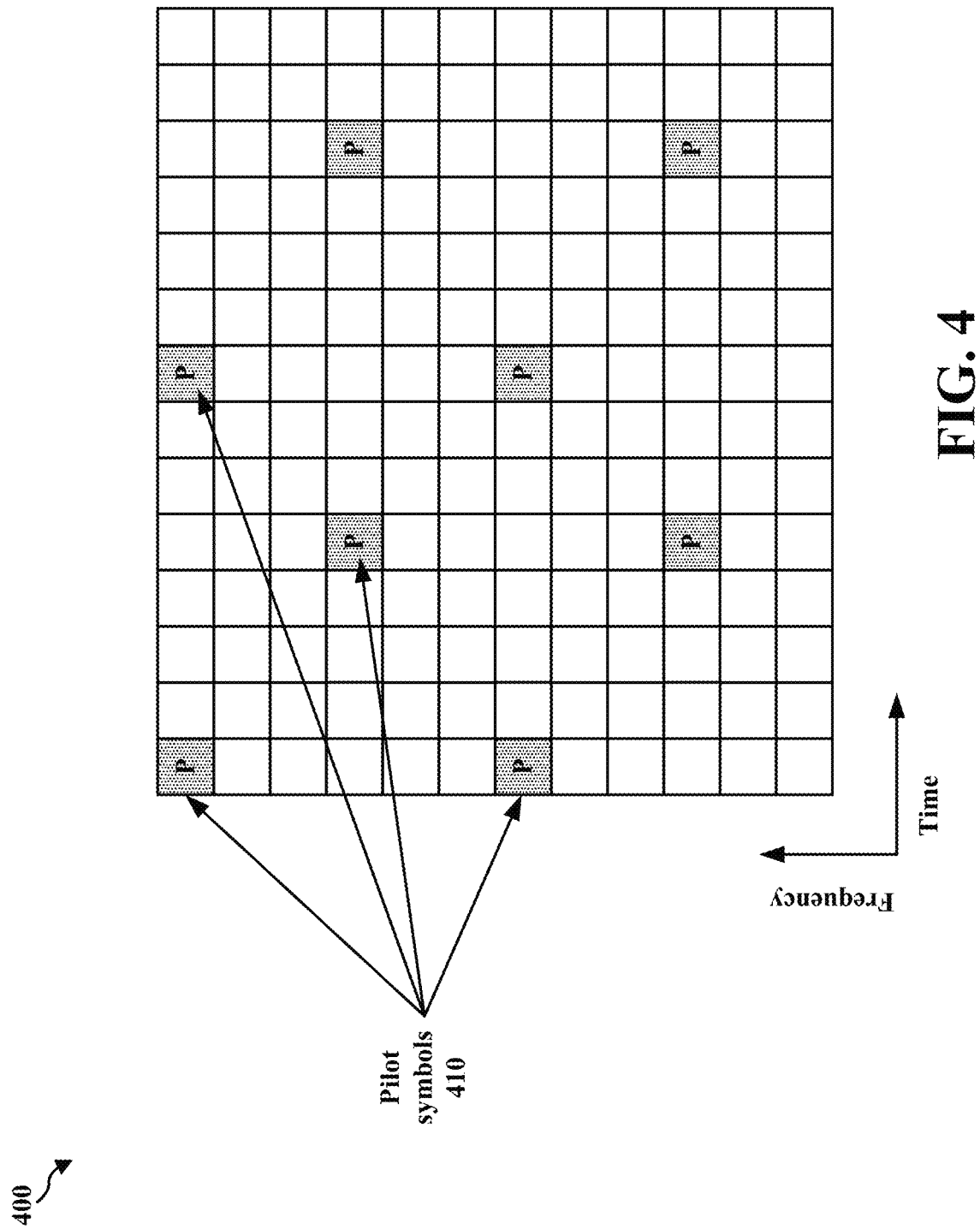
FIG. 4 is a diagram illustrating example pilot symbols for wireless communication.

FIG. 4 is a diagram 400 illustrating example pilot symbols within a subframe. As shown in FIG. 4, diagram 400 includes pilot symbols 410 (e.g., 8 pilot positions in 4 different OFDM symbols within the subframe). Diagram 400 depicts that the subframe extends across both time and frequency. Further, the pilot symbols 410 are uniquely positioned within the subframe in order to ensure that the pilot symbols do not interfere with one another. For example, each of the pilot symbols 410 is spaced across the subframe to avoid interfering with other pilot symbols.

Some aspects of wireless communication may measure a frequency error between a UE and a base station during transmissions. The frequency error may correspond to the difference between an actual frequency of a transmission/reception (e.g., at a base station) and the assigned frequency at the receiver.

Additionally, in some aspects of wireless communications, pilot symbols may be utilized in order to measure the frequency error of certain transmissions. For instance, a pilot or data may be transmitted via a certain channel and pilot symbols may be utilized to measure the frequency error. That is, the frequency error may be measured from pilot symbols (e.g., two pilot symbols) received via a channel. The frequency error may also be associated with a spacing between pilots in the subframe.

As indicated herein, the frequency error may be estimated based on an algorithm, e.g., a frequency tracking loop (FTL) algorithm. Additionally, a maximum pull-in range of an FTL algorithm may be limited by a time separation (Tp) between the pilot symbols. This time separation between the pilot symbols may be used to estimate the frequency error. In some instances, any residual frequency error outside of a certain range (e.g., a range of $$\left(\frac{-1}{2Tp}, \frac{1}{2Tp}\right))$$

may cause a wraparound of the computed frequency error. The wraparound (e.g., frequency wraparound) may result in a change in sign of the frequency error, which may lead to the frequency compensation being applied in a wrong direction. This may subsequently cause an increase in the total frequency offset, rather than reducing the total frequency offset. Further, this may eventually cause the total frequency offset to equal $$+/-\frac{1}{Tp}$$

or a multiple or the time separation in the steady state, including a residual frequency error (e.g., a residual frequency error of 0) due to the wraparound. As such, the wraparound may prevent proper frequency tracking. Moreover, such a high frequency offset in steady state may cause persistent significant loss of orthogonality of OFDM, and thus a loss of signal-to-noise ratio (SNR). This may result in severe decoding errors and a loss of throughput.

Figure 5:
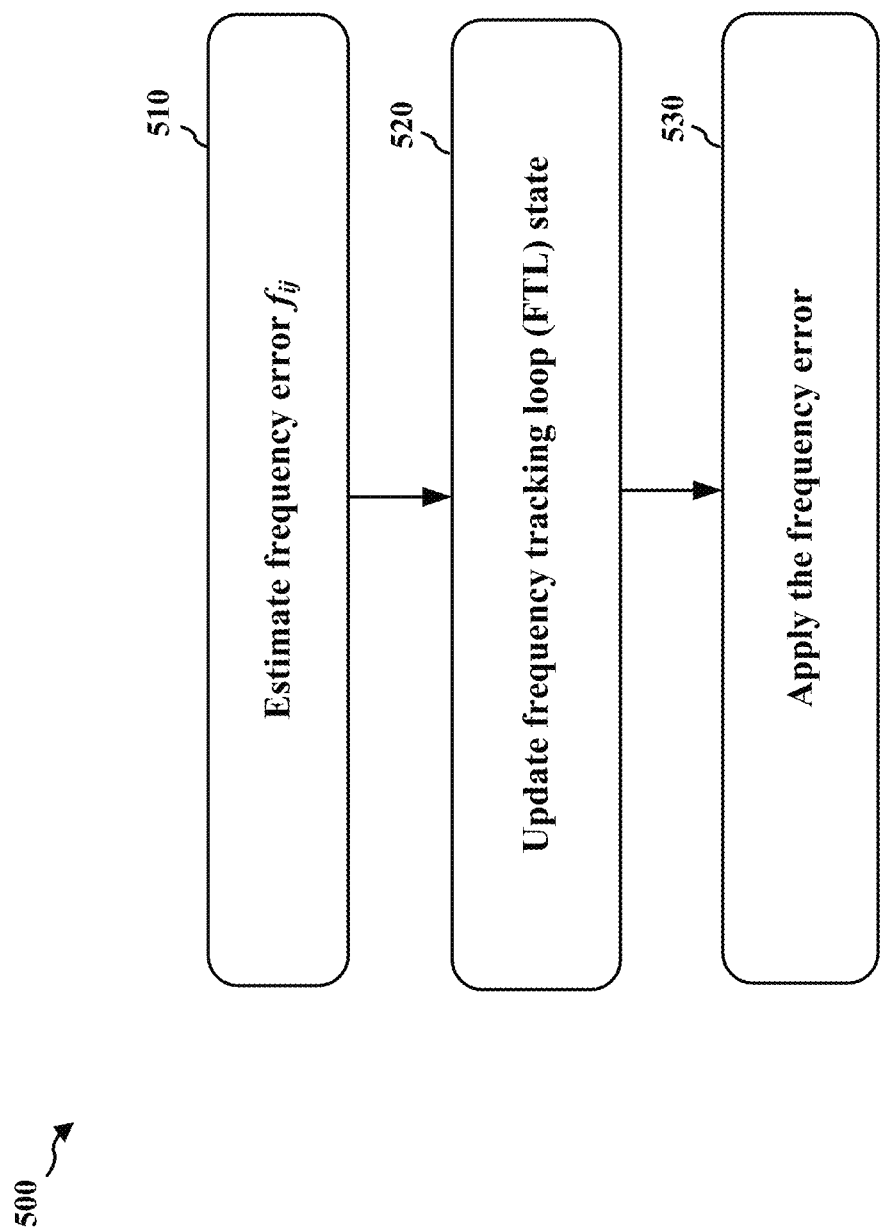
FIG. 5 is a diagram illustrating an example flowchart for wireless communication.

FIG. 5 is a diagram 500 illustrating an example flowchart for frequency error estimation. As shown in FIG. 5, diagram 500 includes steps 510-530 for frequency error estimation. More specifically, diagram 500 depicts frequency error estimation utilizing a frequency tracking loop (FTL) state. At step 510, the frequency error (A) may be estimated. Next, at step 520, a frequency tracking loop (FTL) state may be updated. At step 530, the frequency error may be applied.

Figure 6:
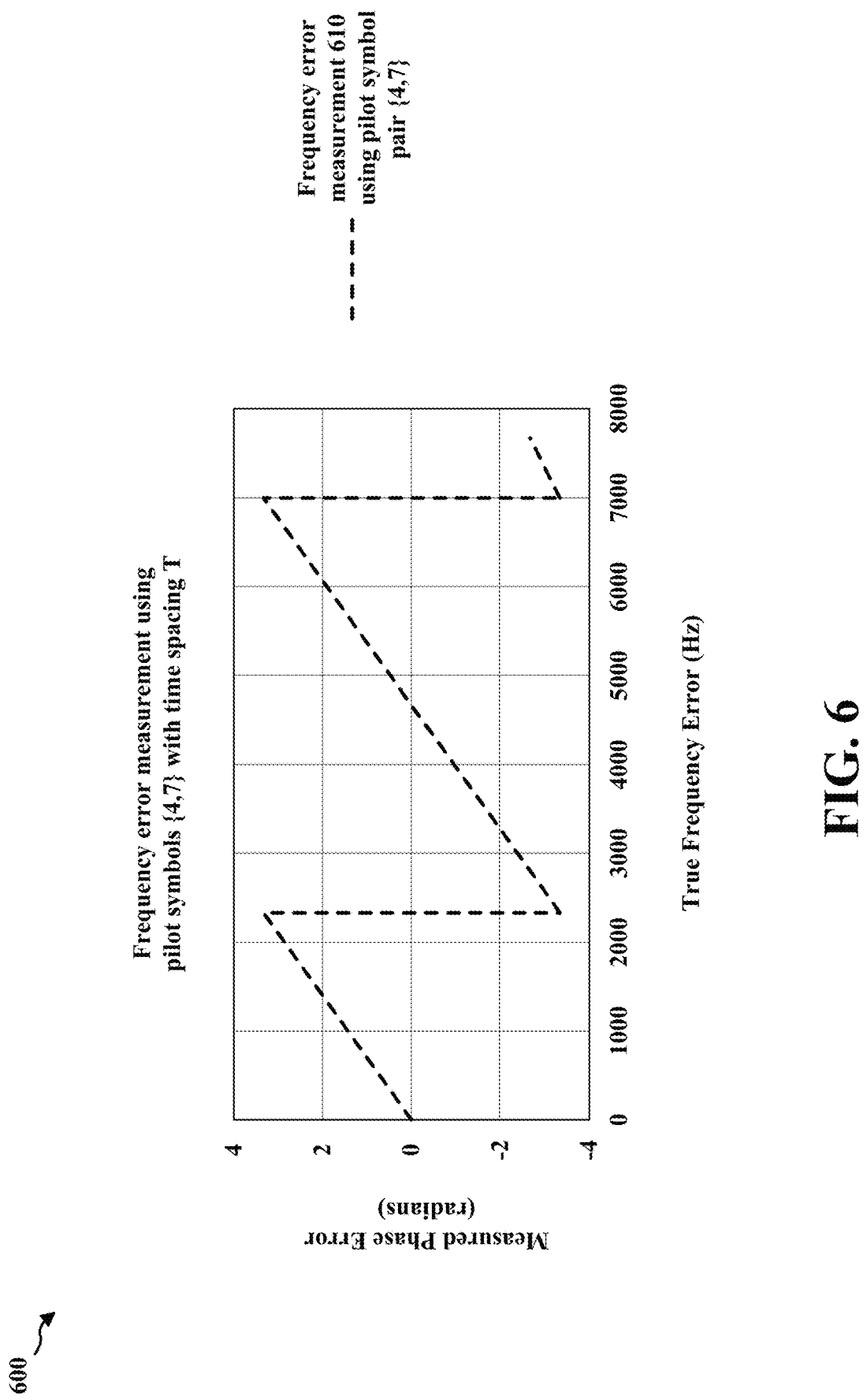
FIG. 6 is a graph illustrating an example frequency error measurement.

FIG. 6 is a graph 600 illustrating an example frequency error measurement. As shown in FIG. 6, graph 600 includes an x-axis of true frequency error (in Hz) and a y-axis of measured phase error (in radians). More specifically, graph 600 depicts a frequency error measurement 610 using pilot symbols (e.g., two pilot symbols {4,7}) with a time spacing (T) in seconds. As depicted in FIG. 6, there is a phase difference between the channels of the two pilot symbols. For example, the phase difference from the two pilot symbols {4,7}) may be equal to: $\Phi=2*\pi*fe*T$, where $\Phi$ is the phase difference, fe is the frequency error, and T is the time spacing between the pilot symbols. In FIG. 6, the phase wraparound occurs at $+/-\pi$ by $2\pi$, which corresponds to a frequency error wraparound at $+/-(1/2T)$ by $(1/T)$. This phrase wraparound and frequency error wraparound may cause frequency error compensation in an incorrect direction, as well as severe loss of SNR.

As indicated herein, some types of wireless communication may utilize inefficient frequency error measurements that result in frequency wraparound. For example, the frequency wraparound may prevent proper frequency tracking. Further, the frequency wraparound may result in a significant loss of orthogonality of OFDM, and thus a loss of SNR. This may result in severe decoding errors and a loss of throughput. As such, it may be beneficial to utilize frequency error measurements that allow for proper frequency tracking. For instance, it may be beneficial to utilize frequency error measurements that maintain the orthogonality of OFDM and do not result in a loss of SNR. Additionally, it may be beneficial to utilize frequency error measurements that result in accurate decoding and maintain throughput.

Aspects of the present disclosure may utilize efficient and accurate frequency error measurements. For instance, aspects of the present disclosure may adjust frequency error measurements based on a detected frequency wraparound. Aspects of the present disclosure may also utilize frequency error measurements that allow for proper frequency tracking. Additionally, in some instances, aspects of the present disclosure may utilize frequency error measurements that maintain the orthogonality of OFDM and do not result in a loss of SNR. More specifically, aspects of the present disclosure may utilize frequency error measurements that result in accurate decoding and provide the ability to maintain throughput.

In some instances, aspects of the present disclosure may utilize frequency wraparound (e.g., FTL wraparound) detection and correction. Aspects of the present disclosure may leverage the frequency error measured from different pairs of pilot symbols (e.g., two different pairs of pilot symbols) which have a different time separation in order to detect the FTL wraparound. For two pairs of pilot symbols, aspects of the present disclosure may denote one pair by symbols $S_{i1}$, $S_{j1}$ with time separation $T_1$ and another pair by symbols $S_{i2}$, $S_{j2}$ with time separation $T_2$. The actual residual frequency error may be denoted by $f_e$. The frequency error estimated from the pair $S_{i1}$, $S_{j1}$ may be $f_1$ and the frequency error estimated from the pair $S_{i2}$, $S_{j2}$ may be $f_2$. Due to a possible wraparound, $f_1$, $f_2$ may not be equal (or similar) to $f_e$. Additionally, wraparound amounts corresponding to time separations $T_1$ and $T_2$ may be denoted by $F_1$ and $F_2$, where: $F_1=1/T_1$ and $F_2=1/T_2$. As such, ignoring the impact of noise, for i=1,2: $f_i$=fe mod $F_i$, such that $f_1=M*F_1+f_e$ and $f_2=N*F_2+f_e$. This may result in: $f_2-f_1=N*F_2-M*F_1=d(M, N)$. In the above equation, M, N denote the number of wraparounds in the frequency error estimates $f_1$ and $f_2$, respectively. The difference term $d(M, N)$ may take discrete values and may become independent of $f_e$. These values may be referred to as difference levels.

Aspects of the present disclosure may also combat noise in frequency error measurements. In the presence of noise, the above equations may result in noisy measurement $d(M, N)$+noise. However, as long as the difference levels have enough separation (for different (M, N) pairs), aspects of the present disclosure may detect the difference level $d(M, N)$ and hence (M, N) with a high reliability even in the presence of noise. As depicted herein, aspects of the present disclosure may reliably detect up to several wraparounds in $f_1$ and $f_2$.

Additionally, aspects of the present disclosure may allow for the reconstruction of unwrapped frequency error. For instance, once (M, N) is known, aspects of the present disclosure may compute the unwrapped frequency error $f_e$ using the above equations for $f_1$ or $f_2$. However, aspects of the present disclosure may choose between the equations discussed below. The frequency error may be obtained by dividing the estimate of the accumulated phase difference between two pilot symbols by $2\pi*T_p$. Further, the variance of the estimated accumulated phase may correspond to a function of SNR and thus may remain independent of $T_p$ (ignoring the impact of channel variation due to Doppler spread). Hence, as the pilot spacing $T_p$ increases, the variance in the computed frequency may reduce. Aspects of the present disclosure may therefore select one equation (e.g., $f_1=M*F_1+f_e$) if $F_1<F_2$ (equivalently $T_2<T_1$), or may select another equation (e.g., $f_2=N*F_2+f_e$) if $F_1 \geq F_2$.

Aspects of the present disclosure may also utilize a procedure to determine and extend a pull-in range. For instance, aspects presented herein may design a procedure to determine the set A which is the feasible set of pairs (M, N) such that the difference between any two different levels $d(M=i, N=j)$ and $d(M=l, N=k)$ is larger than a threshold $\tau$. $\tau$ may be a design parameter and may help to protect against noise. Also, $\tau$ may be tuned based on SNR or determined based on the lowest supported SNR. The set A may have (M=i, N=j) and (M=l, N=k) which are distinct pairs, while i=l or j=k. For any N=k wraps in $f_2$, the actual underlying frequency error may be in the range:

$$R(F_2, k) = \left(F_2*k - \frac{F_2}{2}, F_2*k + \frac{F_2}{2}\right).$$

Similarly, $$R(F_1, l) = \left(F_1*l - \frac{F_1}{2}, F_1*l + \frac{F_1}{2}\right)$$

may define the actual frequency error range corresponding to M=l wraps in $f_1$. Also, $F_2>F_1$ may be assumed without loss of generality.

Aspects of the present disclosure may determine elements in set A. Considering $k \geq 0$ and $l \geq 0$, and starting with k=0, aspects presented herein may execute steps 1-3 below until a stopping criterion is reached. In step 1, for current value of N=k, aspects presented herein may determine all possible values of M=$l \geq 0$, such that $R(F_2, k) \cap R(F_1, l) \neq \emptyset$ (i.e., a null set). In step 2, aspects presented herein may pick each value of l obtained from step 1 in an ascending order, and add both pairs (M=l, N=k) and (M=−l, N=−k) to set A, until the stopping criterion is hit. The stopping criterion may be defined as: $|d(M=i, N=j)-d(M=l, N=k)| \leq \tau$, for any (M=i, N=j) that has already been added to A. In step 3, if the stopping criterion is not hit, N=k+1 may be incremented.

Further, in some instances, aspects of the present disclosure may achieve a pull-in range and an effective time separation. The pull in range may be determined based on the maximum allowed value for M and N. For instance, let $M_{max}$=max(M) considering $M \geq 0$ and $N_{max}$=max(N) considering $N \geq 0$, such that (M, N)$\in$ A. Also, varying N from $-N_{max}$ to $N_{max}$ may span the underlying frequency of and varying M from $-M_{max}$ to $M_{max}$ may span $$\left(-N_{max}*F_2 - \frac{F2}{2}, N_{max}*F_2 + \frac{F2}{2}\right)$$

the range $$\left(-M_{max}*F_1 - \frac{F1}{2}, M_{max}*F_1 + \frac{F1}{2}\right).$$

Hence, the achieved pull-in range may be the intersection of these two ranges, given by:

$$(-F_{max}, F_{max}), \text{ where } F_{max} = \min\left(M_{max}*F_1 + \frac{F1}{2}, N_{max}*F_2 + \frac{F2}{2}\right).$$

Aspects of the present disclosure may also achieve an effective time separation. For instance, given the achieved pull-in range $(-F_{max}, F_{max})$, aspects presented herein may define the effective time separation, $T_{eff}$, as one which provides a similar pull-in range:

$$T_{eff} = \frac{1}{2*F_{max}}.$$

Moreover, using the same actual time separations $T_1$ and $T_2$, aspects presented herein may achieve an extended pull-in range corresponding to an effective time separation, $T_{eff}$ provided by:

$$T_{eff} = \frac{1}{2*F_{max}}.$$

In some instances, aspects of the present disclosure may generalize the aforementioned technique when $f_1$ and $f_2$ are measured from different subframes and with different rotator values, i.e., the current frequency compensation applied. The rotator value while $f_1$ is measured from $S_{i1}$, $S_{j1}$ may be $F_{rot1}$ and rotator value while $f_2$ is measured from $S_{i2}$, $S_{j2}$ may be $F_{rot2}$. The underlying total frequency error while $f_1$ and $f_2$ are measured may be assumed to remain the same. Also, the underlying residual frequency with rotator value $F_{rot1}$ may be $f_e$ and the underlying residual frequency with $F_{rot2}$ may be $f_{e_2}$. This may result in: $f_1=M*F_1+f_{e_1}$; and $f_2=N*F_2+f_{e_2}$. As such, the difference between $f_1$ and $f_2$ may be: $f_2-f_1=N*F_2-M*F_1+f_{e_2}-f_{e_1}$. As the underlying total frequency error may be assumed to be same, this results in the following formula: $f_{e_2}-f_{e_1}=F_{rot1}-F_{rot2}$. Using the above equations, d(M, N) may be redefined as: $f_2-f_1-(F_{rot1}-F_{rot2})=N*F_2-M*F_1=d$ (M, N). Accordingly, the same techniques discussed above may be used for wraparound detection and corrections.

Figure 7:
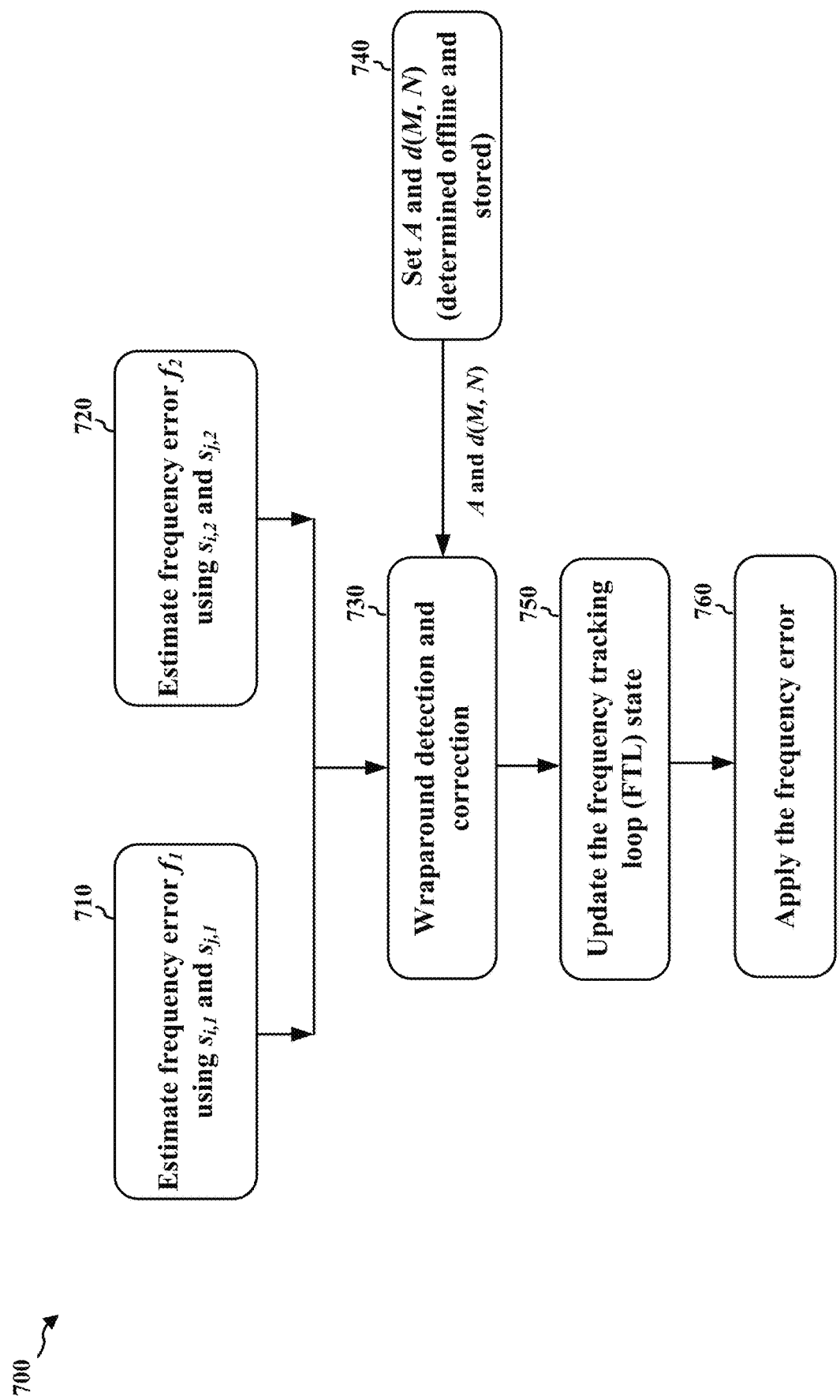
FIG. 7 is a diagram illustrating an example flowchart for wireless communication.

FIG. 7 is a diagram 700 illustrating an example flowchart for frequency error estimation. As shown in FIG. 7, diagram 700 includes steps 710-760 for frequency error estimation. More specifically, diagram 700 depicts frequency error estimation utilizing wraparound detection and correction. At step 710, the frequency error ($f_1$) may be estimated using $S_{i1}$ and $S_{j1}$. Further, at step 720, the frequency error ($f_2$) may be estimated using $S_{i2}$ and $S_{j2}$. At step 730, aspects presented herein may perform wraparound detection and correction.

Also, at step 740, aspects presented herein may determine the values of A and d(M, N), which may be determined offline and stored. At step 750, a frequency tracking loop (FTL) state may be updated. Further, at step 760, the frequency error may be applied. FIG. 7 depicts one example of frequency error estimation that may utilize multiple frequency error measurements to detect and correct a frequency wraparound.

Figure 8:
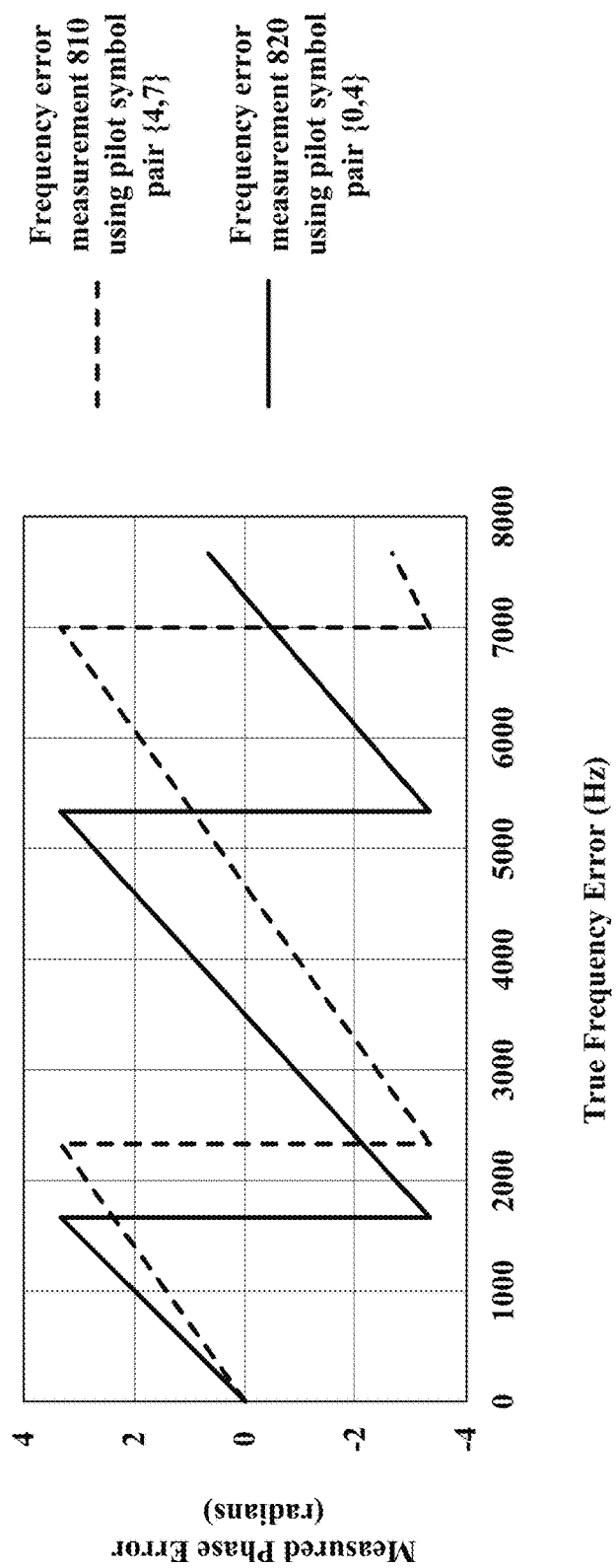
FIG. 8 is a graph illustrating example frequency error measurements.

FIG. 8 is a graph 800 illustrating an example frequency error measurement. As shown in FIG. 8, graph 800 includes an x-axis of true frequency error (in Hz) and a y-axis of measured phase error (in radians) from the correlation computed between pilots. More specifically, graph 800 depicts a frequency error measurement 810 using a first pair of pilot symbols (e.g., pilot symbol pair {4,7}) with a time spacing $T_1$ and a frequency error measurement 820 using a second pair of pilot symbols (e.g., pilot symbol pair {0,4}) with a time spacing $T_2$. As depicted in FIG. 8, frequency error measurement 810 and frequency error measurement 820 may use a first pair and a second pair of pilot symbols, respectively, to detect an amount of wrapping. The first pair and second pair of pilot symbols may have different pilot spacings $T_1$ and $T_2$, respectively. In FIG. 8, the phase wrap occurs at $+/-\pi$ by $2\pi$, which corresponds to a frequency error wraparound at $+/-(1/2T_i)$ by $(1/T_i)$. As shown in FIG. 8, the wrapping point and wrapping amount are different for the first pair and second pair of pilot symbols. In FIG. 8, both measured frequency error measurement 810 and frequency error measurement 820 may be parallel at some points. This difference between frequency error measurement 810 and frequency error measurement 820 is a function of the amount of wrapping of each curve and not a true frequency error, so the difference between the two curves may become quantized. Hence, the difference may be used for detecting and correcting the wraps.

Figure 9B:
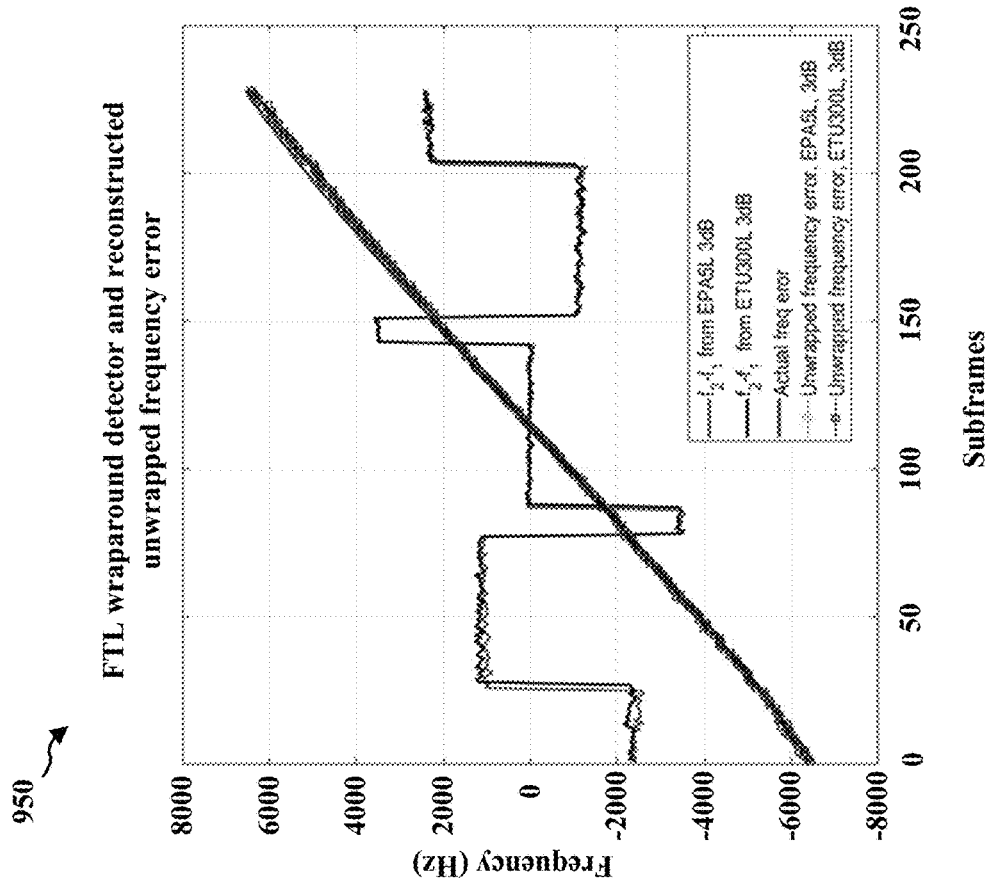
FIGS. 9A and 9B are graphs illustrating example levels of frequency error measurements.
Figure 9A:
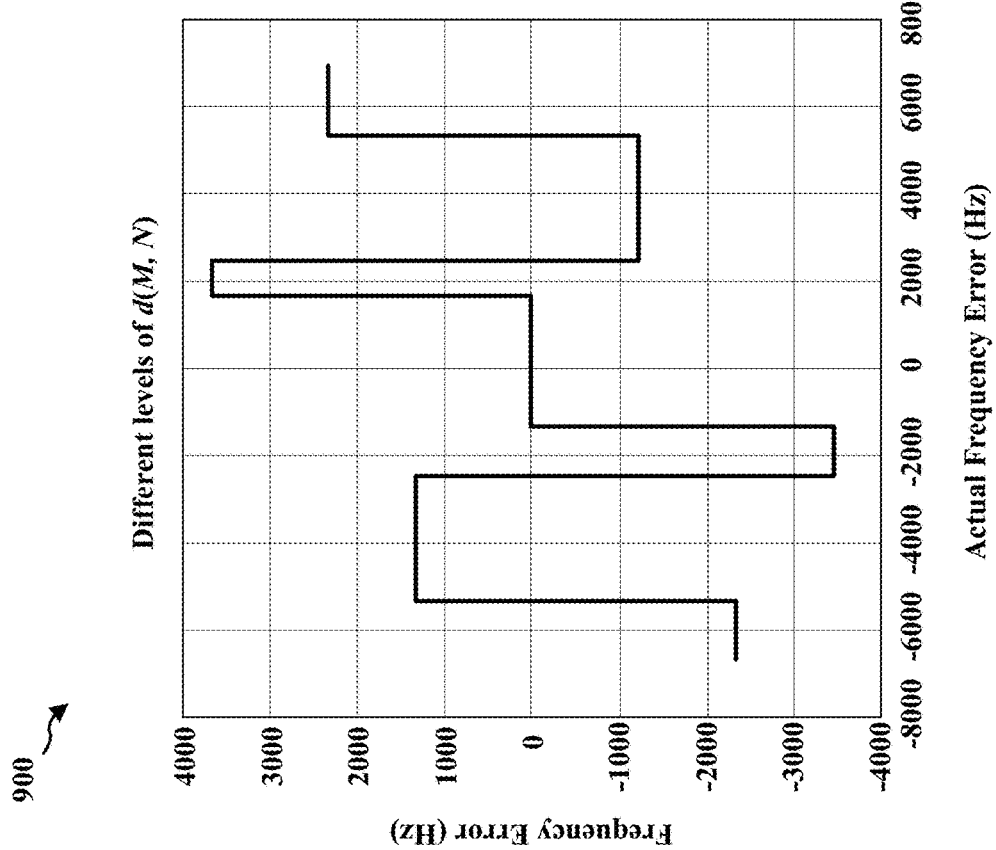

FIG. 9A is a graph 900 illustrating different levels of frequency error measurements possible in LTE. FIG. 9A shows the different levels of d(M, N) corresponding to set A. The separation between any two levels in FIG. 9A may be 1000 Hz, which provides a high wraparound detection reliability in the presence of noise. In the example in FIG. 9A, in order to measure a residual frequency error, an example wireless device may use either CRS symbols 0,4 or CRS symbols 4,7. Also, if $T_1$ is the time separation between symbols 0 and 4 and $T_2$ is the time separation between symbols 4 and 7, this may result in $F_1=3503.6$ Hz with a pull-in range $(-1752,1752)$ Hz, and may result in $F_2=4660.2$ Hz with a pull-in range $(-2330,2330)$ Hz. Based on this, for FIG. 9A, the set A may be: A={(0, 0), (1,0), (−1,0), (1,1), (−1, −1), (2,1), (−2, −1)}.

As depicted in FIG. 9A, aspects presented herein may detect up to a certain number of wraps (e.g., 2, 1 wraps) of frequency measurement from pilot symbol pairs in LTE (e.g., pilot symbol pairs {0,4}, {4,7}). Also, the difference levels (d(M, N)) may become quantized to levels greater than 1000 Hz apart. Hence, the difference may be resilient to noise. Aspects presented herein may also result in pull-in range improvement, where a default pull-in range is: $+/-2330$ Hz, and an improved pull-in range according to the present disclosure is: $+/-6990$ Hz (i.e., a 3× improvement). Further, the effective symbol spacing may be $6990=1/(2*T_{eff})$, where $T_{eff}=71.53$ μsec or 1 OFDM symbol. As depicted in graph 950 in FIG. 9B, a sinusoidally varying frequency offset of amplitude 10,000 Hz and a time period of 1 second may be applied under different wireless channel fading models at 3 dB SNR. Aspects presented herein may apply FTL wraparound detection and correction logic to reconstruct the actual unwrapped frequency error in the range [−6.9 KHz, 6.9 KHz]. An achieved pull-in range (in Hz) may be: (−6990.3, 6990.3), which may provide a pull-in range improvement as the closest pilot spacing that may be achieved otherwise in LTE is from CRS 4 and 7, where the pull-in range is restricted to +/−2330 Hz.

Aspects of the present disclosure may include a number of benefits or advantages. For instance, aspects of the present disclosure may result in an extended FTL pull-in range. Aspects of the present disclosure may also allow for a lower noise variance in frequency error measurements as compared to reduced pilot spacing. For example, the measured frequency error may be: $\Phi/2*\pi*T$, where T is the spacing between pilots. As the noise in $\Phi$ may be divided by T, the frequency estimation error variance may be: $\alpha$ $(1/T^2)$. Aspects of the present disclosure may perform wrap around detection based on the frequency measurement from different pairs of pilot symbols and apply the wrap around correction on the frequency measurement from the symbol pair with the largest spacing in time, thereby reducing the noise variance. Moreover, aspects of the present disclosure may effectively reduce the pilot density, thus achieving increased capacity. Aspects presented herein may also be able to converge an FTL even with higher frequency errors.

Additionally, aspects presented herein may further reduce the complexity and processing power of UEs during certain reception modes, e.g., extended discontinuous reception (eDRX) mode. Aspects presented herein may be used to correct large potential frequency errors during wake-up after long sleeps in eDRX scenarios in subframes, thereby reducing the warm-up time which may result in saving power.

In some aspects, a target maximum frequency offset detection and correction that the UE supports may be denoted by $+/-F_{max}$. Then the effective pilot spacing may be: $Tp=1/(2*F_{max})$. By utilizing aspects present herein, there may be two distinct pilot pairs with spacings $T_1$, $T_2$ such that the frequency measurement from each of these pairs can be used to obtain an effective pilot spacing of Teff=Tp. In some instances, Teff may be smaller than $T_1$ and $T_2$, where there is a factor of $$\frac{\min(T1, T2)}{\text{Teff}}$$

improvement in the pull-in range. In aspects where $F_{max}$ may become a bottleneck for choosing pilot spacing Tp, aspects presented herein may achieve the same $F_{max}$ with a significantly larger average pilot spacing provided by $T_1$ and $T_2$.

Figure 10:
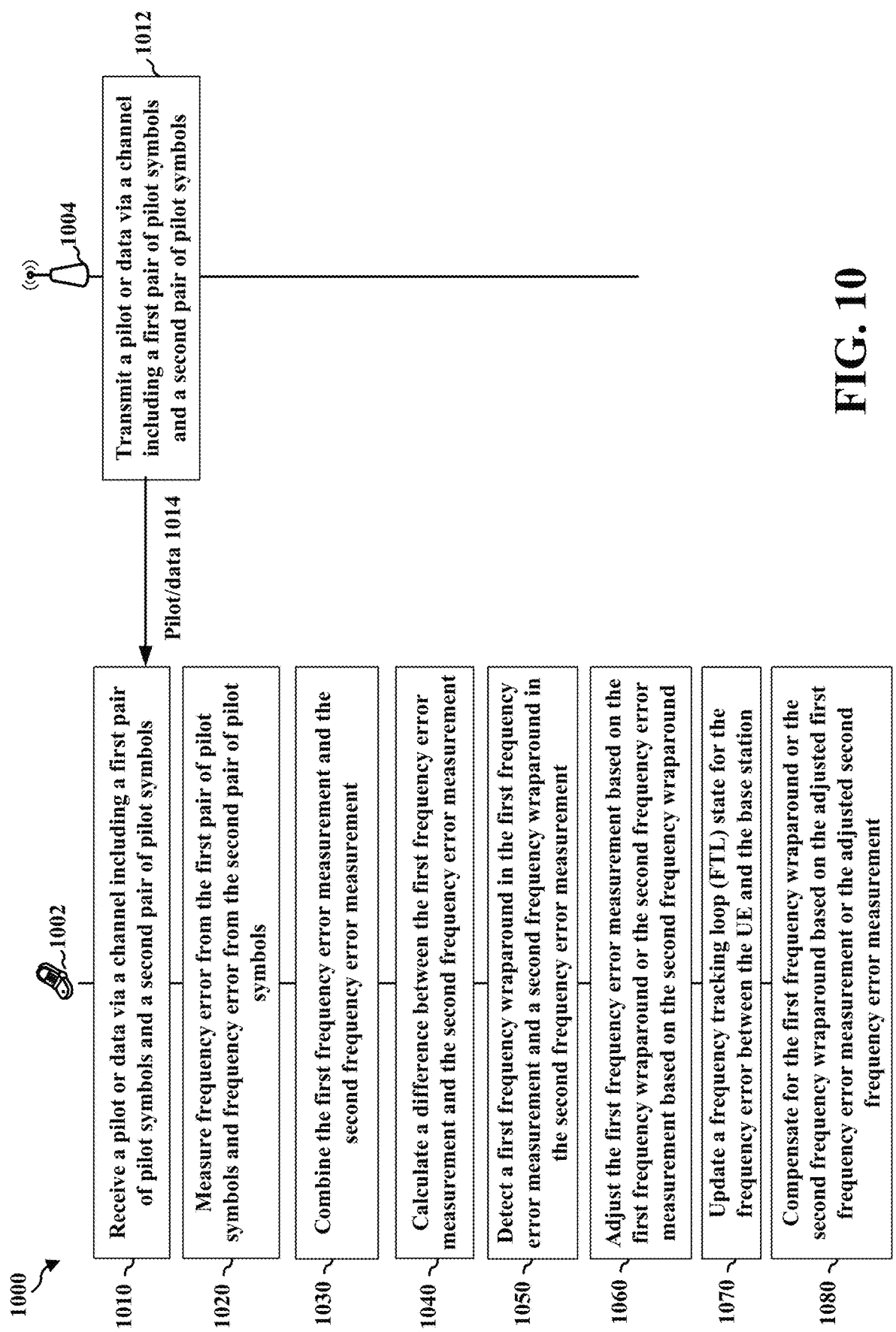
FIG. 10 is a diagram illustrating example communication between a UE and a base station.

FIG. 10 is a diagram 1000 illustrating example communication between a UE 1002 and a base station 1004.

At 1010, UE 1002 may receive, from a base station (e.g., base station 1004), at least one of a pilot or data (e.g., pilot/data 1014) via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel. Likewise, at 1012, base station 1004 may transmit at least one of a pilot or data (e.g., pilot/data 1014) via a channel, where the channel includes a first pair of pilot symbols and a second pair of pilot symbols.

At 1020, UE 1002 may measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement. The first frequency error measurement and the second frequency error measurement may be associated with a frequency tracking loop (FTL) algorithm.

At 1030, UE 1002 may combine the first frequency error measurement and the second frequency error measurement, where the first frequency error measurement or the second frequency error measurement is adjusted based on the combination.

At 1040, UE 1002 may calculate a difference between the first frequency error measurement and the second frequency error measurement, where the first frequency wraparound or the second frequency wraparound is detected based on the difference between the first frequency error measurement and the second frequency error measurement. In some aspects, the difference between the first frequency error measurement and the second frequency error measurement may be calculated as: $f_2-f_1=N*F_2-M*F_1$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, and $T_2$ is a second time spacing between the second pair of pilot symbols. Also, the difference between the first frequency error measurement and the second frequency error measurement may be calculated as: $f_2-f_1=N*F_2-M*F_1+(F_{comp1}-F_{comp2})$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, $T_2$ is a second time spacing between the second pair of pilot symbols, $F_{comp1}$ is a first frequency compensation value based on at least one previous frequency error measurement at a time of the first frequency error measurement, and $F_{comp2}$ is a second frequency compensation value based on one or more previous frequency error measurements at a time of the second frequency error measurement.

At 1050, UE 1002 may detect a first frequency wraparound in the first frequency error measurement and a second frequency wraparound in the second frequency error measurement. The first frequency wraparound may be proportional to a first wraparound in phase based on a correlation between the first pair of pilot symbols and the second frequency wraparound may be proportional to a second wraparound in phase based on a correlation between the second pair of pilot symbols, where the first wraparound in phase is a first constant value and the second wraparound in phase is a second constant value. Also, a first time spacing ($T_1$) between the first pair of pilot symbols may be different from a second time spacing ($T_2$) between the second pair of pilot symbols, where an amount of the first frequency wraparound may be equal to ($1/T_1$) and an amount of the second frequency wraparound may be equal to ($1/T_2$).

At 1060, UE 1002 may adjust the first frequency error measurement based on the detected first frequency wraparound or the second frequency error measurement based on the detected second frequency wraparound if the first frequency wraparound is a non-zero value or the second frequency wraparound is the non-zero value. In some aspects, adjusting the first frequency error measurement or the second frequency error measurement may include correcting for the first frequency error measurement or the second frequency error measurement. Further, adjusting the first frequency error measurement or the second frequency error measurement may include: adding or subtracting a first multiple ($1/T_1$) to the first frequency error measurement ($f_1$) or adding or subtracting a second multiple ($1/T_2$) to the second frequency error measurement ($f_2$), where $T_1$ is a first time spacing between the first pair of pilot symbols and $T_2$ is a second time spacing between the second pair of pilot symbols. Also, adding or subtracting the first multiple ($1/T_1$) to the first frequency error measurement ($f_1$) may unwrap the first frequency wraparound, and adding or subtracting the second multiple ($1/T_2$) to the second frequency error measurement ($f_2$) may unwrap the second frequency wraparound.

At 1070, UE 1002 may update a frequency tracking loop (FTL) state for the frequency error between the UE and the base station based on the adjusted first frequency error measurement or the adjusted second frequency error measurement.

At 1080, UE 1002 may compensate for the first frequency wraparound or the second frequency wraparound based on the adjusted first frequency error measurement or the adjusted second frequency error measurement.

Figure 11:
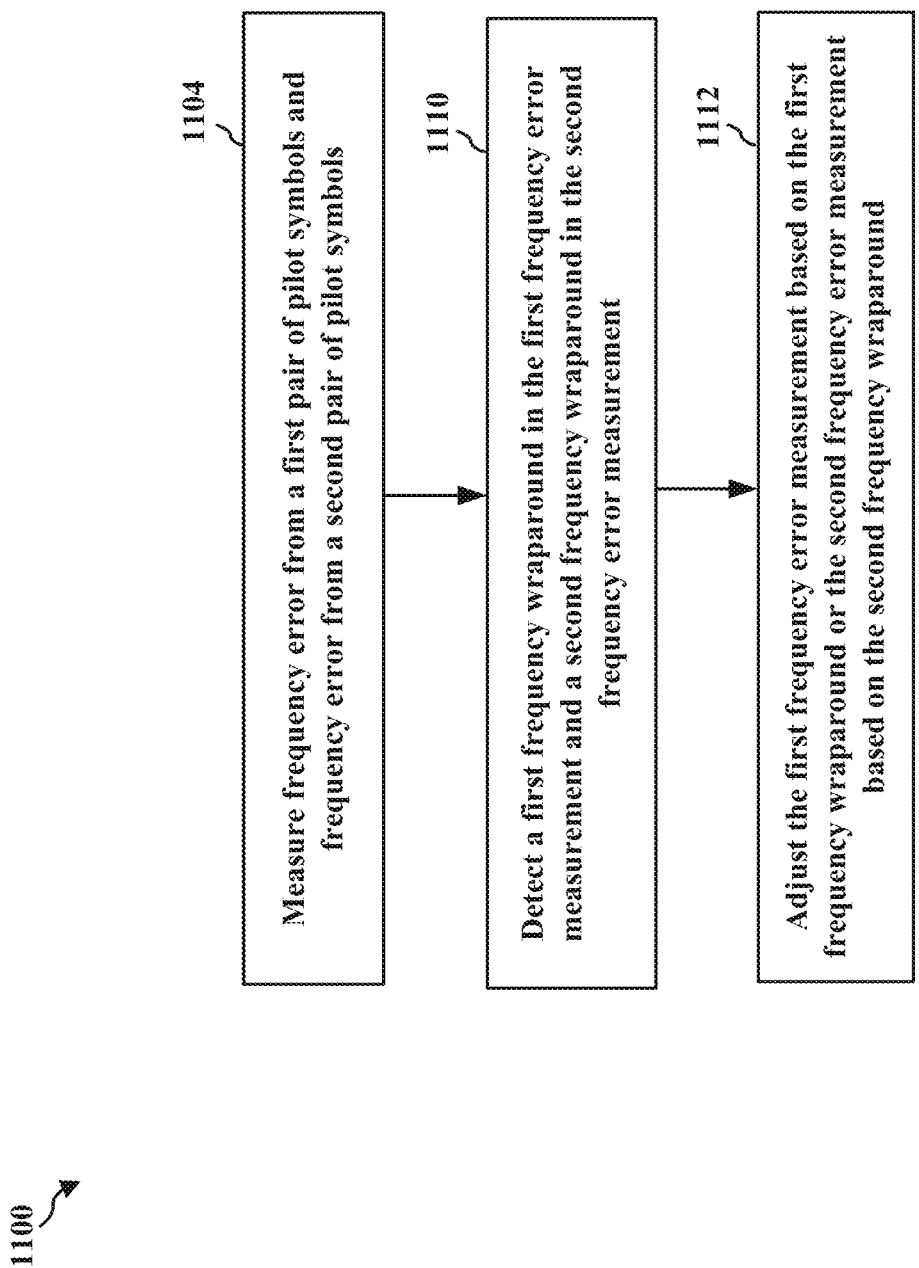
FIG. 11 is a flowchart of a method of wireless communication.

FIG. 11 is a flowchart 1100 of a method of wireless communication. The method may be performed by a UE or a component of a UE (e.g., the UE 104, 350, 1002; the apparatus 1302). The methods described herein may provide a number of benefits, such as improving communication signaling, resource utilization, and/or power savings.

At 1104, the UE may measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement, as described in connection with the examples in FIGS. 4-10. For example, UE 1002 may measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement, as described in connection with 1020 in FIG. 10. Further, 1104 may be performed by determination component 1340 in FIG. 13. The first frequency error measurement and the second frequency error measurement may be associated with a frequency tracking loop (FTL) algorithm.

At 1110, the UE may detect a first frequency wraparound in the first frequency error measurement and a second frequency wraparound in the second frequency error measurement, as described in connection with the examples in FIGS. 4-10. For example, UE 1002 may detect a first frequency wraparound in the first frequency error measurement and a second frequency wraparound in the second frequency error measurement, as described in connection with 1050 in FIG. 10. Further, 1110 may be performed by determination component 1340 in FIG. 13. The first frequency wraparound may be proportional to a first wraparound in phase based on a correlation between the first pair of pilot symbols and the second frequency wraparound may be proportional to a second wraparound in phase based on a correlation between the second pair of pilot symbols, where the first wraparound in phase is a first constant value and the second wraparound in phase is a second constant value. Also, a first time spacing ($T_1$) between the first pair of pilot symbols may be different from a second time spacing ($T_2$) between the second pair of pilot symbols, where an amount of the first frequency wraparound may be equal to ($1/T_1$) and an amount of the second frequency wraparound may be equal to ($1/T_2$).

At 1112, the UE may adjust the first frequency error measurement based on the detected first frequency wraparound or the second frequency error measurement based on the detected second frequency wraparound if the first frequency wraparound is a non-zero value or the second frequency wraparound is the non-zero value, as described in connection with the examples in FIGS. 4-10. For example, UE 1002 may adjust the first frequency error measurement based on the detected first frequency wraparound or the second frequency error measurement based on the detected second frequency wraparound if the first frequency wraparound is a non-zero value or the second frequency wraparound is the non-zero value, as described in connection with 1060 in FIG. 10. Further, 1112 may be performed by determination component 1340 in FIG. 13. In some aspects, adjusting the first frequency error measurement or the second frequency error measurement may include correcting for the first frequency error measurement or the second frequency error measurement. Further, adjusting the first frequency error measurement or the second frequency error measurement may include: adding or subtracting a first multiple ($1/T_1$) to the first frequency error measurement ($f_1$) or adding or subtracting a second multiple ($1/T_2$) to the second frequency error measurement ($f_2$), where $T_1$ is a first time spacing between the first pair of pilot symbols and $T_2$ is a second time spacing between the second pair of pilot symbols. Also, adding or subtracting the first multiple ($1/T_1$) to the first frequency error measurement ($f_1$) may unwrap the first frequency wraparound, and adding or subtracting the second multiple ($1/T_2$) to the second frequency error measurement ($f_2$) may unwrap the second frequency wraparound.

Figure 12:
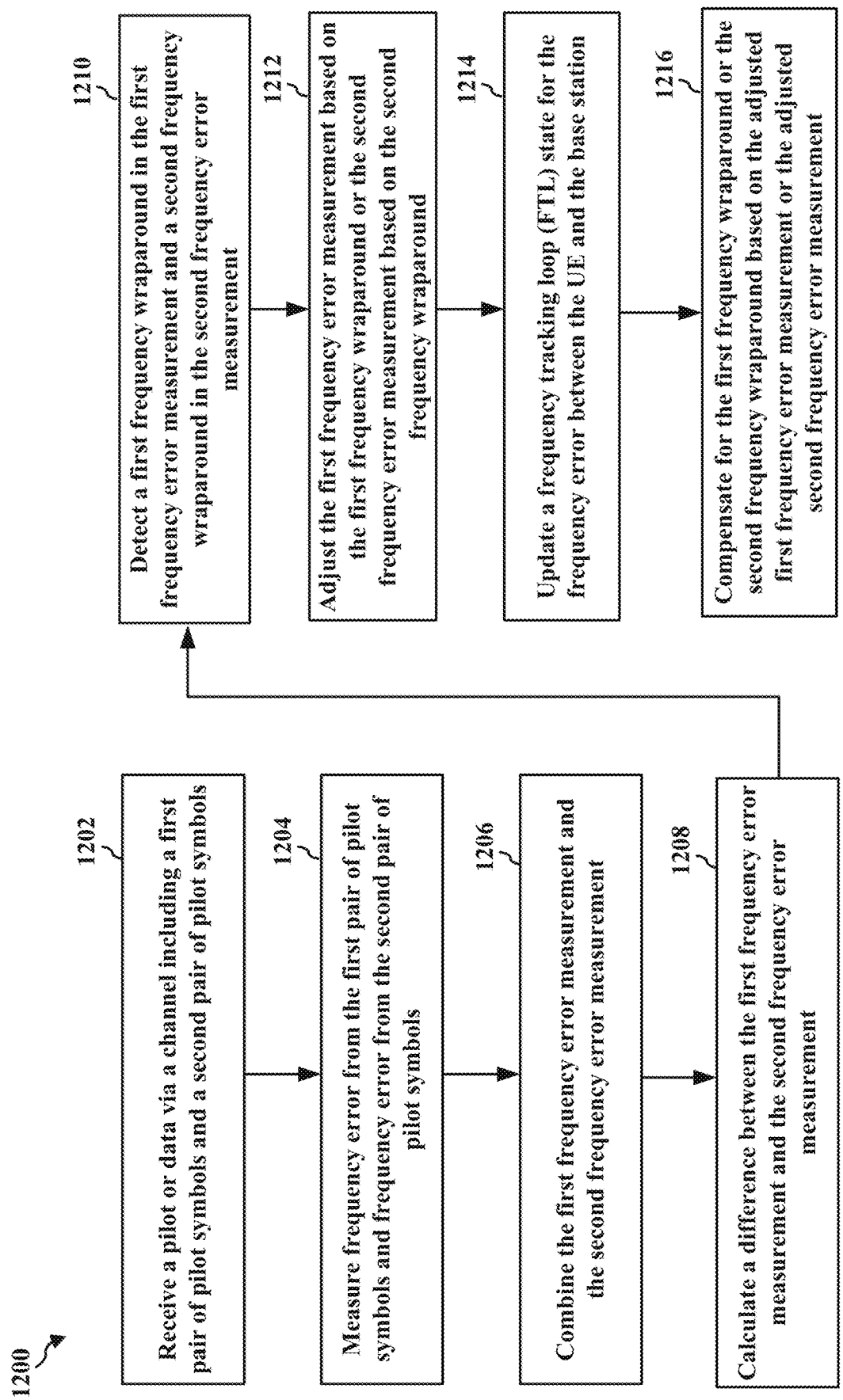
FIG. 12 is a flowchart of a method of wireless communication.

FIG. 12 is a flowchart 1200 of a method of wireless communication. The method may be performed by a UE or a component of a UE (e.g., the UE 104, 350, 1002; the apparatus 1302). The methods described herein may provide a number of benefits, such as improving communication signaling, resource utilization, and/or power savings.

At 1202, the UE may receive, from a base station, at least one of a pilot or data via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel, as described in connection with the examples in FIGS. 4-10. For example, UE 1002 may receive, from a base station, at least one of a pilot or data via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel, as described in connection with 1010 in FIG. 10. Further, 1202 may be performed by determination component 1340 in FIG. 13.

At 1204, the UE may measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement, as described in connection with the examples in FIGS. 4-10. For example, UE 1002 may measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement, as described in connection with 1020 in FIG. 10. Further, 1204 may be performed by determination component 1340 in FIG. 13. The first frequency error measurement and the second frequency error measurement may be associated with a frequency tracking loop (FTL) algorithm.

At 1206, the UE may combine the first frequency error measurement and the second frequency error measurement, where the first frequency error measurement or the second frequency error measurement is adjusted based on the combination, as described in connection with the examples in FIGS. 4-10. For example, UE 1002 may combine the first frequency error measurement and the second frequency error measurement, where the first frequency error measurement or the second frequency error measurement is adjusted based on the combination, as described in connection with 1030 in FIG. 10. Further, 1206 may be performed by determination component 1340 in FIG. 13.

At 1208, the UE may calculate a difference between the first frequency error measurement and the second frequency error measurement, where the first frequency wraparound or the second frequency wraparound is detected based on the difference between the first frequency error measurement and the second frequency error measurement, as described in connection with the examples in FIGS. 4-10. For example, UE 1002 may calculate a difference between the first frequency error measurement and the second frequency error measurement, where the first frequency wraparound or the second frequency wraparound is detected based on the difference between the first frequency error measurement and the second frequency error measurement, as described in connection with 1040 in FIG. 10. Further, 1208 may be performed by determination component 1340 in FIG. 13. In some aspects, the difference between the first frequency error measurement and the second frequency error measurement may be calculated as: $f_2-f_1=N*F_2-M*F_1$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, and $T_2$ is a second time spacing between the second pair of pilot symbols. Also, the difference between the first frequency error measurement and the second frequency error measurement may be calculated as: $f_2-f_1=N*F_2-M*F_1+(F_{comp1}-F_{comp2})$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, $T_2$ is a second time spacing between the second pair of pilot symbols, $F_{comp1}$ is a first frequency compensation value based on at least one previous frequency error measurement at a time of the first frequency error measurement, and $F_{comp2}$ is a second frequency compensation value based on one or more previous frequency error measurements at a time of the second frequency error measurement.

At 1210, the UE may detect a first frequency wraparound in the first frequency error measurement and a second frequency wraparound in the second frequency error measurement, as described in connection with the examples in FIGS. 4-10. For example, UE 1002 may detect a first frequency wraparound in the first frequency error measurement and a second frequency wraparound in the second frequency error measurement, as described in connection with 1050 in FIG. 10. Further, 1210 may be performed by determination component 1340 in FIG. 13. The first frequency wraparound may be proportional to a first wraparound in phase based on a correlation between the first pair of pilot symbols and the second frequency wraparound may be proportional to a second wraparound in phase based on a correlation between the second pair of pilot symbols, where the first wraparound in phase is a first constant value and the second wraparound in phase is a second constant value. Also, a first time spacing ($T_1$) between the first pair of pilot symbols may be different from a second time spacing ($T_2$) between the second pair of pilot symbols, where an amount of the first frequency wraparound may be equal to ($1/T_1$) and an amount of the second frequency wraparound may be equal to ($1/T_2$).

At 1212, the UE may adjust the first frequency error measurement based on the detected first frequency wraparound or the second frequency error measurement based on the detected second frequency wraparound if the first frequency wraparound is a non-zero value or the second frequency wraparound is the non-zero value, as described in connection with the examples in FIGS. 4-10. For example, UE 1002 may adjust the first frequency error measurement based on the detected first frequency wraparound or the second frequency error measurement based on the detected second frequency wraparound if the first frequency wraparound is a non-zero value or the second frequency wraparound is the non-zero value, as described in connection with 1060 in FIG. 10. Further, 1212 may be performed by determination component 1340 in FIG. 13. In some aspects, adjusting the first frequency error measurement or the second frequency error measurement may include correcting for the first frequency error measurement or the second frequency error measurement. Further, adjusting the first frequency error measurement or the second frequency error measurement may include: adding or subtracting a first multiple ($1/T_1$) to the first frequency error measurement ($f_1$) or adding or subtracting a second multiple ($1/T_2$) to the second frequency error measurement ($f_2$), where $T_1$ is a first time spacing between the first pair of pilot symbols and $T_2$ is a second time spacing between the second pair of pilot symbols. Also, adding or subtracting the first multiple ($1/T_1$) to the first frequency error measurement ($f_1$) may unwrap the first frequency wraparound, and adding or subtracting the second multiple ($1/T_2$) to the second frequency error measurement ($f_2$) may unwrap the second frequency wraparound.

At 1214, the UE may update a frequency tracking loop (FTL) state for the frequency error between the UE and the base station based on the adjusted first frequency error measurement or the adjusted second frequency error measurement, as described in connection with the examples in FIGS. 4-10. For example, UE 1002 may update a frequency tracking loop (FTL) state for the frequency error between the UE and the base station based on the adjusted first frequency error measurement or the adjusted second frequency error measurement, as described in connection with 1070 in FIG. 10. Further, 1214 may be performed by determination component 1340 in FIG. 13.

At 1216, the UE may compensate for the first frequency wraparound or the second frequency wraparound based on the adjusted first frequency error measurement or the adjusted second frequency error measurement, as described in connection with the examples in FIGS. 4-10. For example, UE 1002 may compensate for the first frequency wraparound or the second frequency wraparound based on the adjusted first frequency error measurement or the adjusted second frequency error measurement, as described in connection with 1080 in FIG. 10. Further, 1216 may be performed by determination component 1340 in FIG. 13.

Figure 13:
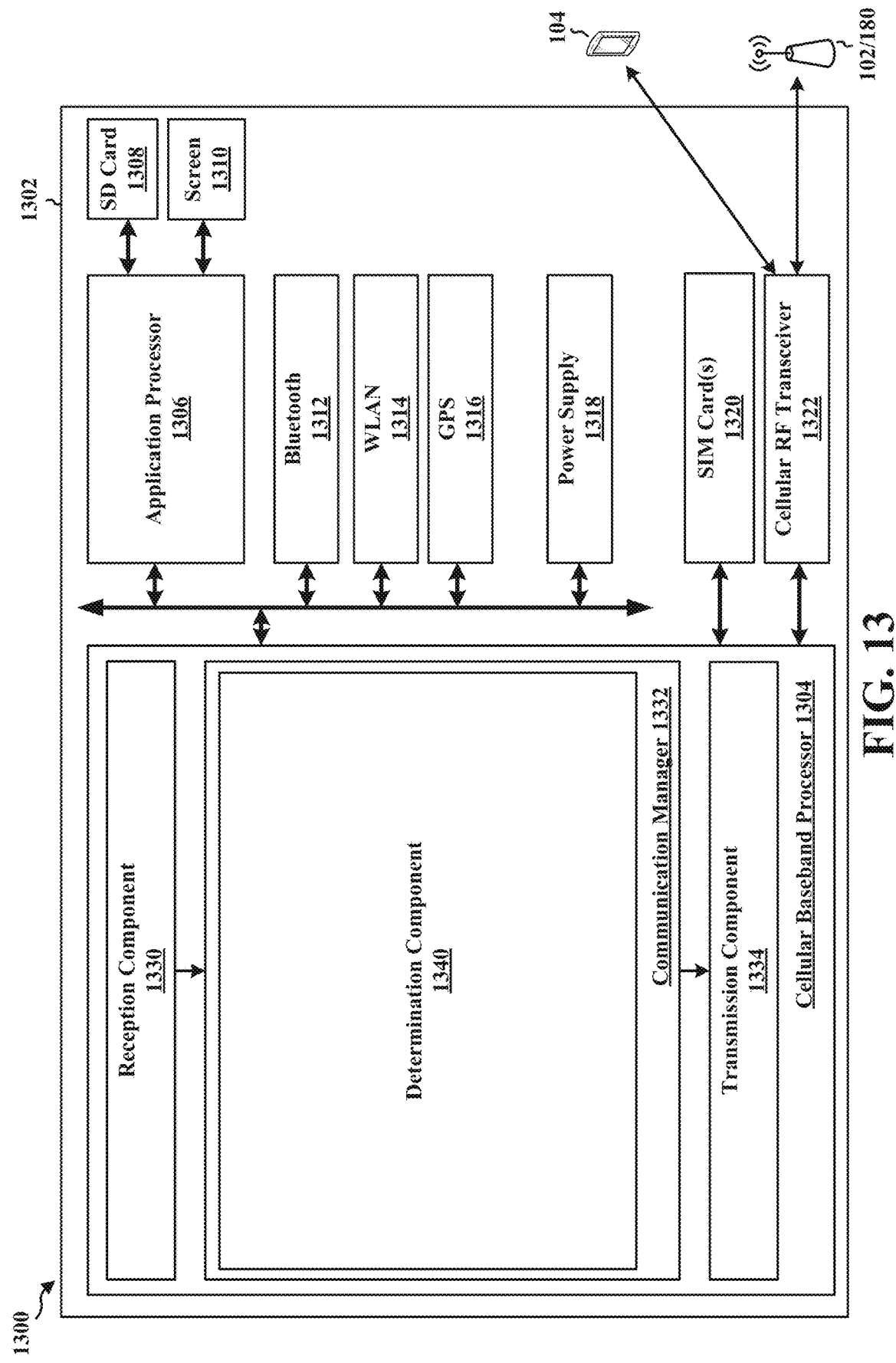
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a determination component 1340 that is configured to receive, from a base station, at least one of a pilot or data via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel, e.g., as described in connection with step 1202 above. Determination component 1340 may also be configured to measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement, e.g., as described in connection with step 1204 above. Determination component 1340 may also be configured to combine the first frequency error measurement and the second frequency error measurement, where the first frequency error measurement or the second frequency error measurement is adjusted based on the combination, e.g., as described in connection with step 1206 above. Determination component 1340 may also be configured to calculate a difference between the first frequency error measurement and the second frequency error measurement, where the first frequency wraparound or the second frequency wraparound is detected based on the difference between the first frequency error measurement and the second frequency error measurement, e.g., as described in connection with step 1208 above. Determination component 1340 may also be configured to detect a first frequency wraparound in the first frequency error measurement and a second frequency wraparound in the second frequency error measurement, e.g., as described in connection with step 1210 above. Determination component 1340 may also be configured to adjust the first frequency error measurement based on the detected first frequency wraparound or the second frequency error measurement based on the detected second frequency wraparound if the first frequency wraparound is a non-zero value or the second frequency wraparound is the non-zero value, e.g., as described in connection with step 1212 above. Determination component 1340 may also be configured to update a frequency tracking loop (FTL) state for the frequency error between the UE and the base station based on the adjusted first frequency error measurement or the adjusted second frequency error measurement, e.g., as described in connection with step 1214 above. Determination component 1340 may also be configured to compensate for the first frequency wraparound or the second frequency wraparound based on the adjusted first frequency error measurement or the adjusted second frequency error measurement, e.g., as described in connection with step 1216 above.

The apparatus may include additional components that perform each of the blocks of the algorithm in the flowcharts of FIGS. 10-12. As such, each block in the flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, at least one of a pilot or data via a channel, where the channel includes a first pair of pilot symbols and a second pair of pilot symbols, where a first frequency error measurement is based on the first pair of pilot symbols received via the channel and a second frequency error measurement is based on the second pair of pilot symbols received via the channel; means for measuring a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement; means for combining the first frequency error measurement and the second frequency error measurement, where the first frequency error measurement or the second frequency error measurement is adjusted based on the combination; means for calculating a difference between the first frequency error measurement and the second frequency error measurement, where the first frequency wraparound or the second frequency wraparound is detected based on the difference between the first frequency error measurement and the second frequency error measurement; means for detecting a first frequency wraparound in the first frequency error measurement and a second frequency wraparound in the second frequency error measurement; means for adjusting the first frequency error measurement based on the detected first frequency wraparound or the second frequency error measurement based on the detected second frequency wraparound if the first frequency wraparound is a non-zero value or the second frequency wraparound is the non-zero value; means for updating a frequency tracking loop (FTL) state for the frequency error between the UE and the base station based on the adjusted first frequency error measurement or the adjusted second frequency error measurement; and means for compensating for the first frequency wraparound or the second frequency wraparound based on the adjusted first frequency error measurement or the adjusted second frequency error measurement. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement; detect a first frequency wraparound in the first frequency error measurement and a second frequency wraparound in the second frequency error measurement; and adjust the first frequency error measurement based on the detected first frequency wraparound or the second frequency error measurement based on the detected second frequency wraparound if the first frequency wraparound is a non-zero value or the second frequency wraparound is the non-zero value.

Aspect 2 is the apparatus of aspect 1, where the at least one processor is further configured to: combine the first frequency error measurement and the second frequency error measurement, where the first frequency error measurement or the second frequency error measurement is adjusted based on the combination.

Aspect 3 is the apparatus of any of aspects 1 and 2, where the at least one processor is further configured to: calculate a difference between the first frequency error measurement and the second frequency error measurement, where the first frequency wraparound or the second frequency wraparound is detected based on the difference between the first frequency error measurement and the second frequency error measurement.

Aspect 4 is the apparatus of any of aspects 1 to 3, where the difference between the first frequency error measurement and the second frequency error measurement is calculated as: $f_2-f_1=N*F_2-M*F_1$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, and $T_2$ is a second time spacing between the second pair of pilot symbols.

Aspect 5 is the apparatus of any of aspects 1 to 4, where the difference between the first frequency error measurement and the second frequency error measurement is calculated as: $f_2-f_1=N*F_2-M*F_1+(F_{comp1}-F_{comp2})$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, $T_2$ is a second time spacing between the second pair of pilot symbols, $F_{comp1}$ is a first frequency compensation value based on at least one previous frequency error measurement at a time of the first frequency error measurement, and $F_{comp2}$ is a second frequency compensation value based on one or more previous frequency error measurements at a time of the second frequency error measurement.

Aspect 6 is the apparatus of any of aspects 1 to 5, where to adjust the first frequency error measurement or the second frequency error measurement, the at least one processor is configured to: correct for the first frequency error measurement or the second frequency error measurement.

Aspect 7 is the apparatus of any of aspects 1 to 6, where the first frequency wraparound is proportional to a first wraparound in phase based on a correlation between the first pair of pilot symbols and the second frequency wraparound is proportional to a second wraparound in phase based on a correlation between the second pair of pilot symbols, where the first wraparound in phase is a first constant value and the second wraparound in phase is a second constant value.

Aspect 8 is the apparatus of any of aspects 1 to 7, where to adjust the first frequency error measurement or the second frequency error measurement, the at least one processor is configured to: add or subtract a first multiple $(1/T_1)$ to the first frequency error measurement $(f_1)$ or add or subtract a second multiple $(1/T_2)$ to the second frequency error measurement $(f_2)$, where $T_1$ is a first time spacing between the first pair of pilot symbols and $T_2$ is a second time spacing between the second pair of pilot symbols.

Aspect 9 is the apparatus of any of aspects 1 to 8, where adding or subtracting the first multiple $(1/T_1)$ to the first frequency error measurement $(f_1)$ unwraps the first frequency wraparound, and where adding or subtracting the second multiple $(1/T_2)$ to the second frequency error measurement $(f_2)$ unwraps the second frequency wraparound.

Aspect 10 is the apparatus of any of aspects 1 to 9, where the at least one processor is further configured to: update a frequency tracking loop (FTL) state for the frequency error between the UE and the base station based on the adjusted first frequency error measurement or the adjusted second frequency error measurement.

Aspect 11 is the apparatus of any of aspects 1 to 10, where the at least one processor is further configured to: compensate for the first frequency wraparound or the second frequency wraparound based on the adjusted first frequency error measurement or the adjusted second frequency error measurement.

Aspect 12 is the apparatus of any of aspects 1 to 11, where the first frequency error measurement and the second frequency error measurement are associated with a frequency tracking loop (FTL) algorithm.

Aspect 13 is the apparatus of any of aspects 1 to 12, where a first time spacing $(T_1)$ between the first pair of pilot symbols is different from a second time spacing $(T_2)$ between the second pair of pilot symbols, where an amount of the first frequency wraparound is equal to $(1/T_1)$ and an amount of the second frequency wraparound is equal to $(1/T_2)$.

Aspect 14 is the apparatus of any of aspects 1 to 13, where the at least one processor is further configured to: receive, from the base station, at least one of a pilot or data via the channel, where the channel includes the first pair of pilot symbols and the second pair of pilot symbols, where the first frequency error measurement is based on the first pair of pilot symbols received via the channel and the second frequency error measurement is based on the second pair of pilot symbols received via the channel.

Aspect 15 is the apparatus of any of aspects 1 to 14, further including a transceiver or an antenna coupled to the at least one processor.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

What is claimed is:

1. An apparatus for wireless communication at a user equipment (UE), comprising:
   a memory; and
   at least one processor coupled to the memory and configured to:
   measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement;
   detect a first frequency wraparound in the first frequency error measurement and a second frequency wraparound in the second frequency error measurement; and
   adjust the first frequency error measurement based on the detected first frequency wraparound or the second frequency error measurement based on the detected second frequency wraparound if the first frequency wraparound is a non-zero value or the second frequency wraparound is the non-zero value.

2. The apparatus of claim 1, wherein the at least one processor is further configured to:
   combine the first frequency error measurement and the second frequency error measurement, wherein the first frequency error measurement or the second frequency error measurement is adjusted based on the combination.

3. The apparatus of claim 1, wherein the at least one processor is further configured to:
calculate a difference between the first frequency error measurement and the second frequency error measurement, wherein the first frequency wraparound or the second frequency wraparound is detected based on the difference between the first frequency error measurement and the second frequency error measurement.

4. The apparatus of claim 3, wherein the difference between the first frequency error measurement and the second frequency error measurement is calculated as: $f_2-f_1=N*F_2-M*F_1$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, and $T_2$ is a second time spacing between the second pair of pilot symbols.

5. The apparatus of claim 3, wherein the difference between the first frequency error measurement and the second frequency error measurement is calculated as: $f_2-f_1=N*F_2-M*F_1+(F_{comp1}-F_{comp2})$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, $T_2$ is a second time spacing between the second pair of pilot symbols, $F_{comp1}$ is a first frequency compensation value based on at least one previous frequency error measurement at a time of the first frequency error measurement, and $F_{comp2}$ is a second frequency compensation value based on one or more previous frequency error measurements at a time of the second frequency error measurement.

6. The apparatus of claim 1, wherein to adjust the first frequency error measurement or the second frequency error measurement, the at least one processor is configured to: correct for the first frequency error measurement or the second frequency error measurement.

7. The apparatus of claim 1, wherein the first frequency wraparound is proportional to a first wraparound in phase based on a correlation between the first pair of pilot symbols and the second frequency wraparound is proportional to a second wraparound in phase based on a correlation between the second pair of pilot symbols, wherein the first wraparound in phase is a first constant value and the second wraparound in phase is a second constant value.

8. The apparatus of claim 1, wherein to adjust the first frequency error measurement or the second frequency error measurement, the at least one processor is configured to: add or subtract a first multiple ($1/T_1$) to the first frequency error measurement ($f_1$) or add or subtract a second multiple ($1/T_2$) to the second frequency error measurement ($f_2$), where $T_1$ is a first time spacing between the first pair of pilot symbols and $T_2$ is a second time spacing between the second pair of pilot symbols.

9. The apparatus of claim 8, wherein adding or subtracting the first multiple ($1/T_1$) to the first frequency error measurement ($f_1$) unwraps the first frequency wraparound, and wherein adding or subtracting the second multiple ($1/T_2$) to the second frequency error measurement ($f_2$) unwraps the second frequency wraparound.

10. The apparatus of claim 1, wherein the at least one processor is further configured to:

update a frequency tracking loop (FTL) state for the frequency error between the UE and the base station based on the adjusted first frequency error measurement or the adjusted second frequency error measurement.

11. The apparatus of claim 1, wherein the at least one processor is further configured to:
compensate for the first frequency wraparound or the second frequency wraparound based on the adjusted first frequency error measurement or the adjusted second frequency error measurement.

12. The apparatus of claim 1, wherein the first frequency error measurement and the second frequency error measurement are associated with a frequency tracking loop (FTL) algorithm.

13. The apparatus of claim 1, wherein a first time spacing ($T_1$) between the first pair of pilot symbols is different from a second time spacing ($T_2$) between the second pair of pilot symbols, wherein an amount of the first frequency wraparound is equal to ($1/T_1$) and an amount of the second frequency wraparound is equal to ($1/T_2$).

14. The apparatus of claim 1, further comprising a transceiver or an antenna coupled to the at least one processor, wherein the at least one processor is further configured to:
receive, from the base station, at least one of a pilot or data via the channel, wherein the channel includes the first pair of pilot symbols and the second pair of pilot symbols, wherein the first frequency error measurement is based on the first pair of pilot symbols received via the channel and the second frequency error measurement is based on the second pair of pilot symbols received via the channel.

15. A method of wireless communication at a user equipment (UE), comprising:
measuring a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement;
detecting a first frequency wraparound in the first frequency error measurement and a second frequency wraparound in the second frequency error measurement; and
adjusting the first frequency error measurement based on the detected first frequency wraparound or the second frequency error measurement based on the detected second frequency wraparound if the first frequency wraparound is a non-zero value or the second frequency wraparound is the non-zero value.

16. The method of claim 15, further comprising:
combining the first frequency error measurement and the second frequency error measurement, wherein the first frequency error measurement or the second frequency error measurement is adjusted based on the combination.

17. The method of claim 15, further comprising:
calculating a difference between the first frequency error measurement and the second frequency error measurement, wherein the first frequency wraparound or the second frequency wraparound is detected based on the difference between the first frequency error measurement and the second frequency error measurement.

18. The method of claim 17, wherein the difference between the first frequency error measurement and the second frequency error measurement is calculated as: $f_2-f_1=N*F_2-M*F_1$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, and $T_2$ is a second time spacing between the second pair of pilot symbols.

19. The method of claim 17, wherein the difference between the first frequency error measurement and the second frequency error measurement is calculated as: $f_2-f_1=N*F_2-M*F_1+(F_{comp1}-F_{comp2})$, where $f_1$ is the first frequency error measurement, $f_2$ is the second frequency error measurement, M is a number of first frequency wraparounds in the first frequency error measurement, N is a number of second frequency wraparounds in the second frequency error measurement, $F_1=1/T_1$, $F_2=1/T_2$, $T_1$ is a first time spacing between the first pair of pilot symbols, $T_2$ is a second time spacing between the second pair of pilot symbols, $F_{comp1}$ is a first frequency compensation value based on at least one previous frequency error measurement at a time of the first frequency error measurement, and $F_{comp2}$ is a second frequency compensation value based on one or more previous frequency error measurements at a time of the second frequency error measurement.

20. The method of claim 15, wherein adjusting the first frequency error measurement or the second frequency error measurement comprises: correcting for the first frequency error measurement or the second frequency error measurement.

21. The method of claim 15, wherein the first frequency wraparound is proportional to a first wraparound in phase based on a correlation between the first pair of pilot symbols and the second frequency wraparound is proportional to a second wraparound in phase based on a correlation between the second pair of pilot symbols, wherein the first wraparound in phase is a first constant value and the second wraparound in phase is a second constant value.

22. The method of claim 15, wherein adjusting the first frequency error measurement or the second frequency error measurement comprises: adding or subtracting a first multiple $(1/T_1)$ to the first frequency error measurement $(f_1)$ or adding or subtracting a second multiple $(1/T_2)$ to the second frequency error measurement $(f_2)$, where $T_1$ is a first time spacing between the first pair of pilot symbols and $T_2$ is a second time spacing between the second pair of pilot symbols.

23. The method of claim 22, wherein adding or subtracting the first multiple $(1/T_1)$ the first frequency error measurement $(f_1)$ unwraps the first frequency wraparound, and wherein adding or subtracting the second multiple $(1/T_2)$ to the second frequency error measurement $(f_2)$ unwraps the second frequency wraparound.

24. The method of claim 15, further comprising: updating a frequency tracking loop (FTL) state for the frequency error between the UE and the base station based on the adjusted first frequency error measurement or the adjusted second frequency error measurement.

25. The method of claim 15, further comprising: compensating for the first frequency wraparound or the second frequency wraparound based on the adjusted first frequency error measurement or the adjusted second frequency error measurement.

26. The method of claim 15, wherein the first frequency error measurement and the second frequency error measurement are associated with a frequency tracking loop (FTL) algorithm.

27. The method of claim 15, wherein a first time spacing $(T_1)$ between the first pair of pilot symbols is different from a second time spacing $(T_2)$ between the second pair of pilot symbols, wherein an amount of the first frequency wraparound is equal to $(1/T_1)$ and an amount of the second frequency wraparound is equal to $(1/T_2)$.

28. The method of claim 15, further comprising: receiving, from the base station, at least one of a pilot or data via the channel, wherein the channel includes the first pair of pilot symbols and the second pair of pilot symbols, wherein the first frequency error measurement is based on the first pair of pilot symbols received via the channel and the second frequency error measurement is based on the second pair of pilot symbols received via the channel.

29. An apparatus for wireless communication at a user equipment (UE), comprising:
means for measuring a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement;
means for detecting a first frequency wraparound in the first frequency error measurement and a second frequency wraparound in the second frequency error measurement; and
means for adjusting the first frequency error measurement based on the detected first frequency wraparound or the second frequency error measurement based on the detected second frequency wraparound if the first frequency wraparound is a non-zero value or the second frequency wraparound is the non-zero value.

30. A computer-readable medium storing computer executable code at a user equipment (UE), the code when executed by a processor causes the processor to:
measure a frequency error from a first pair of pilot symbols and a second pair of pilot symbols received via a channel associated with communication between the UE and a base station, the measured frequency error from the first pair of pilot symbols corresponding to a first frequency error measurement and the measured frequency error from the second pair of pilot symbols corresponding to a second frequency error measurement;
detect a first frequency wraparound in the first frequency error measurement and a second frequency wraparound in the second frequency error measurement; and
adjust the first frequency error measurement based on the detected first frequency wraparound or the second frequency error measurement based on the detected second frequency wraparound if the first frequency wraparound is a non-zero value or the second frequency wraparound is the non-zero value.

* * * * *